US 9,755,787 B2

United States Patent
Kim et al.

(10) Patent No.: US 9,755,787 B2
(45) Date of Patent: Sep. 5, 2017

(54) TRANSMISSION CONTROL METHOD FOR HARQ IN MOBILE COMMUNICATION SYSTEM

(75) Inventors: Soeng Hun Kim, Suwon-si (KR); Gert-Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 932 days.

(21) Appl. No.: 12/649,640

(22) Filed: Dec. 30, 2009

(65) Prior Publication Data

US 2010/0169733 A1    Jul. 1, 2010

(30) Foreign Application Priority Data

Dec. 31, 2008   (KR) .................. 10-2008-0138171
Mar. 17, 2009   (KR) .................. 10-2009-0022764

(51) Int. Cl.
  *G06F 11/00*      (2006.01)
  *H04L 1/16*       (2006.01)
  (Continued)

(52) U.S. Cl.
  CPC .......... *H04L 1/1671* (2013.01); *H04L 1/1822* (2013.01); *H04L 1/1829* (2013.01);
  (Continued)

(58) Field of Classification Search
  CPC .................................................. H04L 1/1671
  See application file for complete search history.

(56) References Cited

U.S. PATENT DOCUMENTS 7,310,336 B2   12/2007   Malkamaki
8,200,252 B2    6/2012   Lee et al.
(Continued)

FOREIGN PATENT DOCUMENTS

CN        1524364 A     8/2004
CN      101064590 A    10/2007
(Continued)

OTHER PUBLICATIONS

3GPP TS 36.321, 3rd Generation Partnership Project: Technical Specification Group Radio Access Network; Evolved Universal Terrestrial Radio Access (E-UTRA) Medium Access Control (MAC) protocol specification (Release 8), Technical Specification, Dec. 2008, V8.4.0.

(Continued)

*Primary Examiner* — Christopher McCarthy
(74) *Attorney, Agent, or Firm* — Jefferson IP Law, LLP

(57) ABSTRACT

A transmission control method for HARQ is provided for improving HARQ performance in a mobile communication system. The transmission control method for Hybrid Automatic Repeat reQuest (HARQ) in a mobile communication system according to the present invention includes receiving an downlink resource assignment message; determining whether configured downlink assignment has been indicated to an HARQ entity since a previously received downlink assignment for a User Equipment's (UE's) Cell-Radio Network Temporary Identifier (C-RNTI) for the same HARQ process; maintaining, if the configured downlink assignment has not been indicated to the HARQ entity, the HARQ process; and processing, if the configured downlink assignment has been indicated to the HARQ entity, the downlink resource assignment message as a resource assignment message for initial transmission.

8 Claims, 11 Drawing Sheets

(51) Int. Cl.
*H04L 1/18* (2006.01)
*H04L 1/00* (2006.01)

(52) U.S. Cl.
CPC .......... *H04L 1/1864* (2013.01); *H04L 1/1867* (2013.01); *H04L 1/1893* (2013.01); *H04L 1/1896* (2013.01); *H04L 1/0061* (2013.01); *H04L 1/0072* (2013.01)

(56) References Cited

U.S. PATENT DOCUMENTS

| | | |
|---|---|---|
| 2007/0253393 A1 | 11/2007 | Tseng |
| 2008/0159218 A1 | 7/2008 | Dwarakanath |
| 2008/0225765 A1 | 9/2008 | Marinier et al. |
| 2009/0238128 A1* | 9/2009 | Park et al. .............. 370/329 |
| 2010/0058135 A1* | 3/2010 | Tseng ..................... 714/748 |
| 2010/0067468 A1* | 3/2010 | Ho et al. ................. 370/329 |
| 2011/0182245 A1* | 7/2011 | Malkamaki et al. ..... 370/329 |
| 2013/0315179 A1 | 11/2013 | Meyer et al. |

FOREIGN PATENT DOCUMENTS

| | | |
|---|---|---|
| CN | 101132257 A | 2/2008 |
| CN | 101247171 A | 8/2008 |
| EP | 1816883 A1 | 8/2007 |
| JP | 2011-517886 A | 6/2011 |
| WO | 2008/084949 A1 | 7/2008 |
| WO | 2010033067 A1 | 3/2010 |

OTHER PUBLICATIONS

Ericsson, "Number of HARQ processes for MIMO", 3GPP TSG-RAN2 #64, Nov. 24, 2008, R2-087020.
Panasonic, Email discussion moderator, RNTI discussion (including PDCCH, PDSCH), 3GPP TSGRAN WG1 Meeting #55, Nov. 4, 2008, R1-084505.
Email Rapporteur: "Summary of the email discussion on remaining issues on Semi Persistent Scheduling", 3GPP DRFT; R2-083900 Remaining Issues in Semi Persistent Scheduling REV1.
Samsung: "C-RNTI and NDI for SPS", 3GPP Draft; R2-084464 C-RNTI & NDI for SPS, 3rd Generation Partnership Project(3GPP), Mobile Competence Cetre.
Ericsson: "Corrections to NDI and Tine Alignment handling for SPS", 3GPP Draft; 36321 CR0166R1 (Rel-8)_R2-087075, 3rd Generation Partership Project (3GPP), Mobile Competence Cetre:650, Route Deslucioles;F-06921 Sophia-Antipolis Cedex; France.
Qualcomm Europe, Rules for SPS HARQ process sharing, 3GPP TSG-RAN WG2#64 R2-086258, Nov. 10-14, 2008.
Qualcomm Europe, Rules for SPS HARQ process sharing, 3GPP TSG-RAN WG2#64 R2-086261, Nov. 10-14, 2008.
Samsung, NDI per type of C-RNTI, 3GPP TSG-RAN WG2#64 R2-086621, Nov. 10-14, 2008.

* cited by examiner

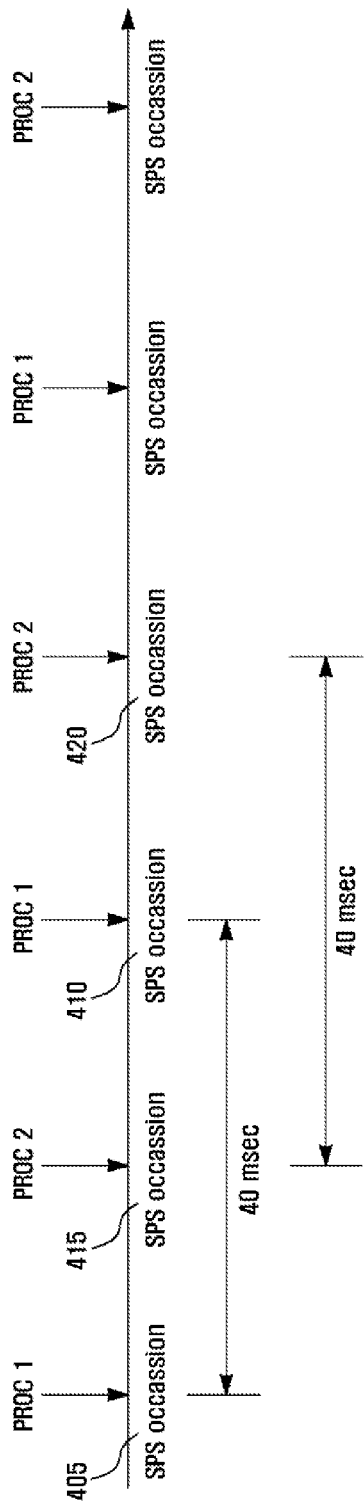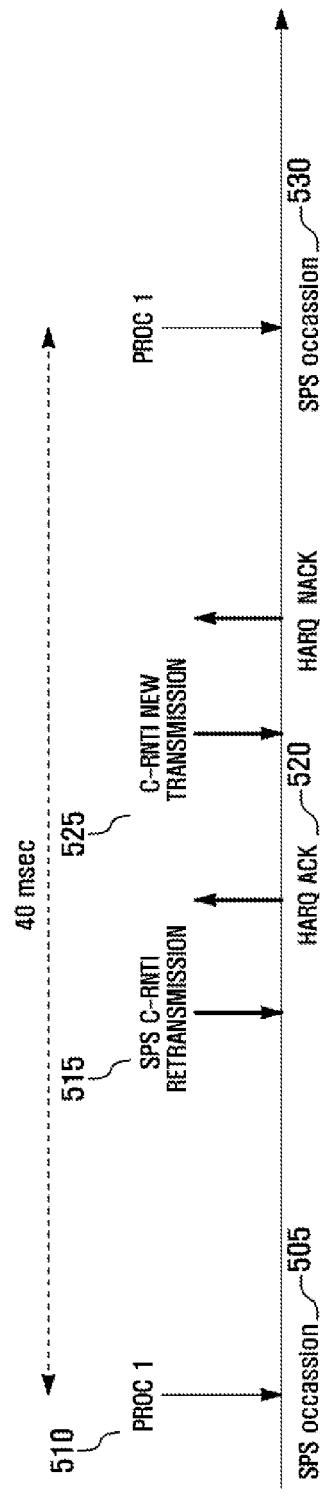

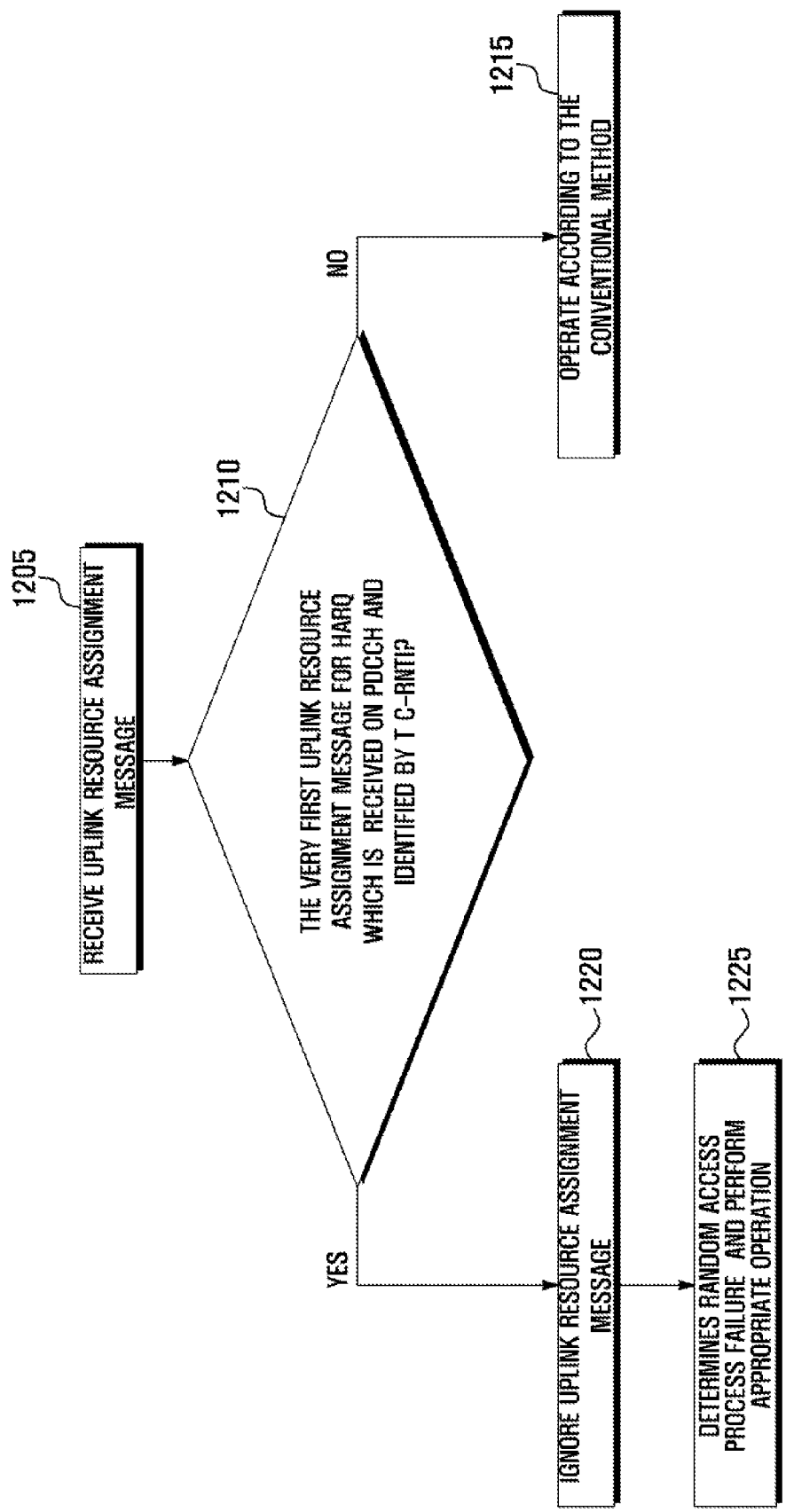

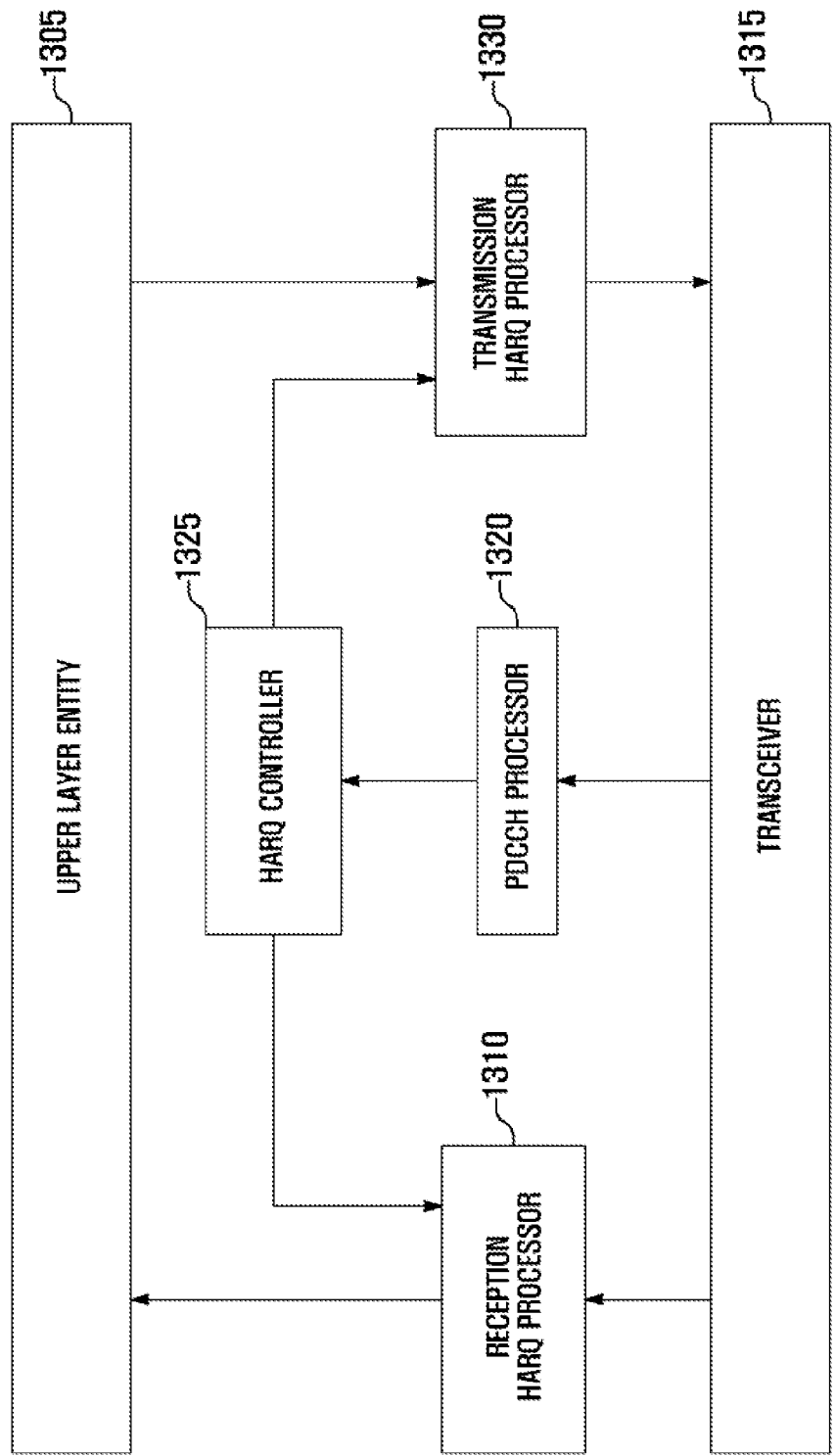

TRANSMISSION CONTROL METHOD FOR HARQ IN MOBILE COMMUNICATION SYSTEM

PRIORITY

This application claims the benefit under 35 U.S.C. §119 (a) of a Korean patent application filed in the Korean Intellectual Property Office on Dec. 31, 2008 and Mar. 17, 2009 and assigned Serial No. 10-2008-0138171 and 10-2009-0022764, the entire disclosures of each of which are hereby incorporated by reference.

BACKGROUND OF THE INVENTION

1. Field of the Invention

The present invention relates to mobile communications. More particularly, the present invention relates to a transmission control method for a Hybrid Automatic Repeat reQuest (HARQ) in a mobile communication system.

2. Description of the Related Art

Universal Mobile Telecommunications System (UMTS) is a third generation (3G) mobile telecommunication technology that evolved from Global System for Mobile communications (GSM) and General Packet Radio Services (GPRS) and uses Wideband Code Division Multiple Access (WCDMA).

The 3G Partnership Project (3GPP), which is responsible for the standardization of UMTS, is working to significantly extend the performance of UMTS in the work item Long Term Evolution (LTE). LTE is a 3GPP standard that provides for a downlink speed of up to 100 and is expected to be commercially launched in 2010. In order to fulfill the requirements for the LTE systems, studies have been done in various aspects including minimization of the number of involved nodes in the connections and placing radio protocol as close as to the radio channels.

FIG. 1 is a schematic diagram illustrating an LTE mobile communication system according to the related art.

As shown in FIG. 1, the LTE mobile communication is characterized in that the Evolved Radio Access Network (hereinafter called E-RAN) 110 and 112 has only two infrastructure nodes: the Evolved Node B (hereinafter called ENB or Node B) 120, 122, 124, 126, and 128 and the Access Gateway (hereinafter called (AG) 130 and 132. A User Equipment (hereinafter called UE) 101 accesses the Internet Protocol (IP) network 114 via the E-RAN 110 and 112.

The ENB's 120, 122, 124, 126, and 128 correspond to conventional Node B which provides the UE 101 with radio access service. However, the ENB's 120, 122, 124, 126, and 128 are responsible for more complex functions than that of the conventional Node B. In the next generation mobile communication system, all user traffic, including real time service such as Voice over IP (VoIP), is served through a shared channel. For this reason, there is a need for a device to collect status information of the UE's and schedule based on the status information. Each of the ENBs 120, 122, 124, 126, and 128 is responsible for scheduling the UE's. In order to achieve the speed of 100 Mbps or faster, the mobile communication system exploits the radio access technology of Orthogonal Frequency Division Multiplexing (OFDM) using a 20 MHz bandwidth. Also, an Adaptive Modulation and Coding (AMC) technique is supported for determining a modulation scheme and a channel coding rate according to the channel status of the UE 101.

FIG. 2 is a diagram illustrating a user plane protocol stack architecture of an LTE mobile communication system according to the related art.

As shown in FIG. 2, the UE has a protocol stack including a Packet Data Convergence Protocol (PDCP) layer 205, a Radio Link Control (RLC) layer 210, a Media Access Control (MAC) layer 215, and a Physical (PHY) layer 220. Similarly, the ENB has a protocol stack including a PDCP layer 240, an RLC layer 235, a MAC layer 230, and a PHY layer 225. The PDCP layers 205 and 240 are responsible for IP header compression/decompression. The RLC layers 210 and 235 pack the PDCP Packet Data Units (PDUs) into a size appropriate for transmission (hereinafter the data unit delivered from an upper layer entity is called PDU) and perform an Automatic Repeat reQuest (ARQ) function. The MAC layers 215 and 230 serve multiple RLC layer entities. Also, the MAC layers 215 and 230 can multiplex the RLC PDUs produced by the RLC layer entities into a single MAC PDU and de-multiplex a MAC PDU into the RLC PDUs. The physical layers 220 and 225 perform encoding and modulation on the upper layer data to transmit through a radio channel and perform demodulation and decoding on the OFDM symbols received through radio channel for delivery to upper layers.

In the LTE mobile communication system, a Hybrid Automatic Repeat reQuest (HARQ) function is provided for more reliable transmission of uplink MAC PDUs. In the mobile communication system using HARQ, when failing receipt of a MAC PDU, the receiver transmits an HARQ Not Acknowledgement (NACK) to the transmitter such that the transmitter, after receiving the HARQ NACK, retransmits the MAC PDU. The receiver performs soft combining to combine the initial transmission and retransmissions.

FIG. 3 is a diagram illustrating a message format of a resource assignment message according to the related art. In the LTE mobile communication system, downlink resource assignment is performed by transmitting a resource assignment message.

Referring to FIG. 3, the resource assignment message includes a Resource Block (RB) assignment field 305 carrying information on the amount and position of the transmission resource. In the LTE mobile communication system, the resource is assigned in units of resource block defined as a frequency bandwidth in length of 1 msec, and the assigned resource is indicated by the RB assignment field 305. The resource assignment message also includes a Modulation and Coding Scheme (MCS) field 310 which indicates the adaptive modulation and coding formats for the transmission data. The resource assignment message also includes a New Data Indicator (NDI) 315. The NDI 315 is 1-bit information to indicate whether the transmission resource assignment message is of either an initial transmission or retransmission. The resource assignment message also includes several other fields designated by reference 330 which are not of concern to the present invention. Accordingly and for sake of brevity, those other fields are not discussed herein.

In conventional downlink data transmission, the base station transmits the resource assignment message using a Physical Downlink Control Channel (PDCCH), and the resource assignment message includes a Cyclic Redundancy Check (CRC) 335. The CRC 335 is computed based on the payload of the resource assignment message and Cell-Radio Network Temporary Identifier (C-RNTI) as a temporary User Equipment (UE) ID. That is, the base station performs the CRC calculation on the data including the payload of the resource assignment message and the C-RNTI, and the CRC calculation result is attached to the resource assignment message. The UE performs CRC testing on the resource assignment message received through the PDCCH with its C-RNTI. If the CRC test is passed, it is determined that the resource assignment message is destined to the UE, whereby the UE locates the resource indicated by the RB assignment field 305 and receives the downlink data transmitted on the resource. The downlink data is transmitted on a Physical Downlink Shared Channel (PDSCH).

Since the resource for the HARQ retransmission is also assigned by means of the resource assignment message, the LTE system is configured to transmit multiple resource assignment messages for a single packet. In a service that periodically generates small packets at a relatively short interval, such as Voice over IP (VoIP) service, it is inefficient to transmit the resource assignment message in a per-packet manner. In order to mitigate this inefficiency, a Semi-Persistent Scheduling (SPS) has been introduced. In the SPS, the resource assigned to the UE is maintained and thus no transmission of additional resource assignment message is required. In more detail, the base station assigns the resource to the UE by means of an SPS resource assignment message on the PDCCH and transmits the packets on the SPS resource.

The SPS resource assignment message may have the same format as the normal resource assignment message as shown in FIG. 3. In order to discriminate between the normal resource assignment message and the SPS resource assignment message, the UE is assigned a separate C-RNTI called SPS C-RNTI. That is, the UE is assigned both the normal C-RNTI and the SPS C-RNTI and performs the CRC test with both the C-RNTI and the SPS C-RNTI. If the CRC test is passed with the normal C-RNTI, this means that the resource assignment message is the normal resource assignment message and otherwise, if the CRC test is passed with the SPS C-RNTI, this means that the resource assignment message is the SPS resource assignment message. In case that the CRC test fails with both the normal C-RNTI and the SPS C-RNTI, the resource assignment message is not destined to the UE.

Once the SPS resource is assigned to the UE, the UE receives the periodically repeating data on the SPS resource. In downlink, only initial transmissions of the HARQ are transmitted on the SPS resource. If the CRC test fails for the packet received on the SPS resource, the UE transmits an HARQ NACK to the base station and, the base station performs the HARQ retransmission using the normal resource assignment. At this time, the retransmission of the packet received on the SPS resource is identified by the SPS C-RNTI. In this case, the NDI is used to discriminate between the initial transmission and retransmission of the received packet. However, since the initial transmission of a packet on the SPS resource is performed without a resource assignment message, it is difficult to discriminate between the initial transmission and retransmission based on toggling of the NDI. Accordingly, when the SPS C-RNTI is used, the meaning of the NDI is fixed to discriminate between the initial transmission and retransmission. For instance, a value of the NDI is set to 1 for retransmission and set to 0 for SPS resource assignment.

Since the NDI is used per HARQ process, when the downlink data transmitted with the normal C-RNTI and the SPS C-RNTI are handled in the same HARQ process, there is no way to distinguish between the initial transmission and retransmission based on the NDI.

SUMMARY OF THE INVENTION

An aspect of the present invention is to address at least the above-mentioned problems and/or disadvantages and to provide at least the advantages described below. Accordingly, an aspect of the present invention is to provide a transmission control method for Hybrid Automatic Repeat reQuest (HARQ) in a mobile communication system that is capable of improving transmission performance by using an improved transmission mechanism in which, when a resource assignment message with the Cell Radio Network Temporary Identifier (C-RNTI) is received first after the assignment of an Semi-Persistent Scheduling (SPS) resource, the User Equipment (UE) considers the resource assignment message as the resource assignment message for a new initial transmission regardless of the value of the New Data Indicator (NDI).

Also, another aspect of the present invention is to provide a transmission control method for HARQ in a mobile communication system that is capable of improving retransmission performance by using an improved HARQ mechanism in which the UE considers the resource assignment message with a C-RNTI received first in an HARQ process as a resource assignment message for a new initial transmission regardless of the NDI value.

In accordance with an exemplary embodiment of the present invention, a transmission control method for HARQ in a mobile communication system is provided. The method includes receiving a downlink resource assignment on a downlink control channel, determining whether the received downlink resource assignment is for a User Equipment's (UE's) Cell-Radio Network Temporary Identifier (C-RNTI) and a previous downlink resource assignment indicated to an HARQ entity of a same HARQ process was a configured downlink resource assignment, and considering, if it is determined that the received downlink resource assignment is for the UE's C-RNTI and the previous downlink resource assignment indicated to the HARQ entity of the same HARQ process was the configured downlink resource assignment, a NDI of the received downlink resource assignment is toggled regardless of a value of the NDI as the downlink resource assignment for initial transmission.

In accordance with another exemplary embodiment of the present invention, a transmission control method for HARQ in a mobile communication system is provided. The method includes receiving a downlink resource assignment on a downlink control channel, determining whether the received downlink resource assignment is for a Cell-Radio Network Temporary Identifier (C-RNTI) and a semi-persistent scheduling resource assignment prior to the received downlink resource assignment is used at a semi-persistent scheduling occasion, comparing, if it is determined that the semi-persistent scheduling resource assignment prior to the received downlink resource assignment is not used at the semi-persistent scheduling occasion and/or the received downlink resource assignment is not for the C-RNTI, values between a current NDI and a previous NDI of downlink resource assignment, and continuing, if the values of both the NDIs are identical with each other, the HARQ operation by soft-combining.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 is a diagram illustrating a principle of Semi-Persistent Scheduling (SPS) resource assignment in a mobile communication system according to an exemplary embodiment of the present invention;

FIG. 5 is a diagram illustrating a principle of using both SPS resource assignment and dynamic resource assignment in a mobile communication system according to an exemplary embodiment of the present invention;

FIG. 12 is a sequence diagram illustrating a procedure for processing an uplink resource assignment message in a UE according to an exemplary embodiment of the present invention; and FIG. 13 is a block diagram illustrating a configuration of a UE according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
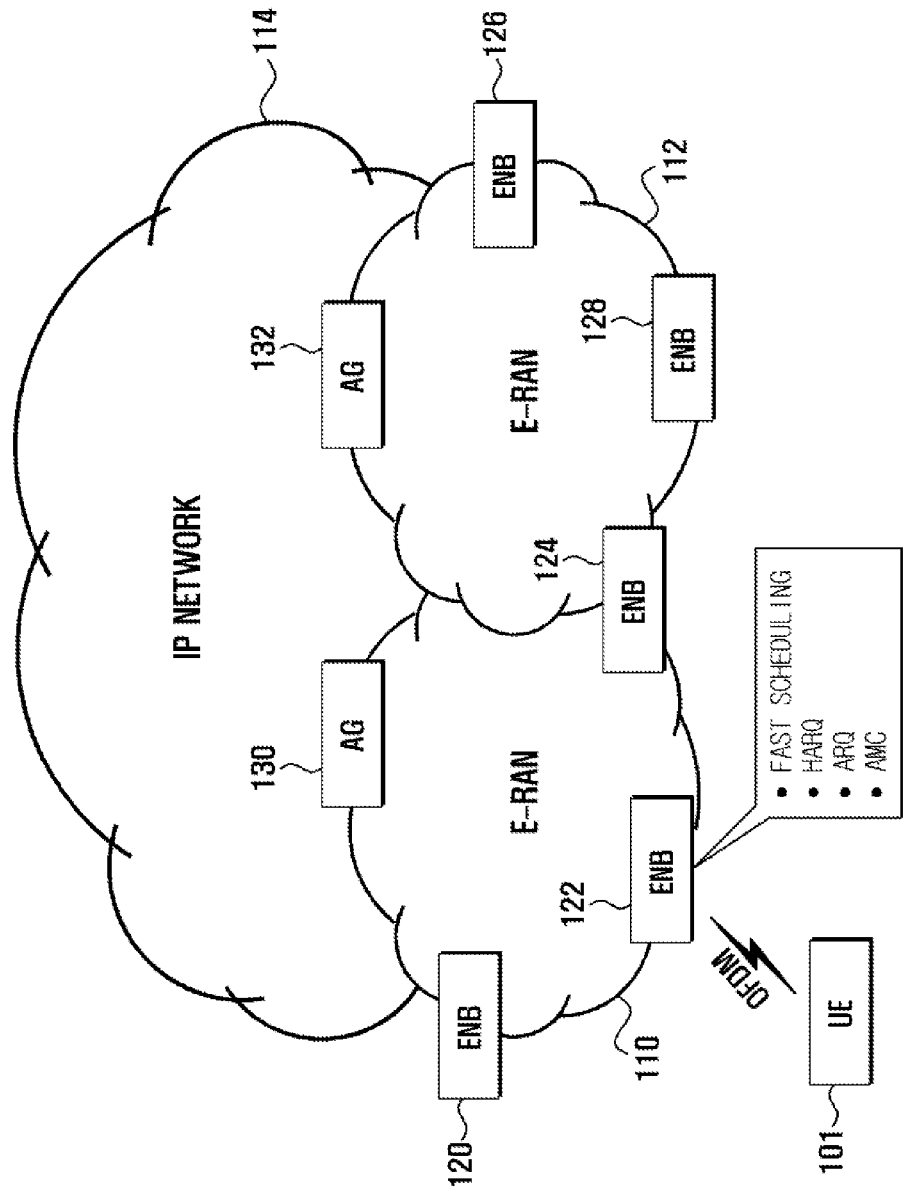
FIG. 1 is a schematic diagram illustrating a Long Term Evolution (LTE) mobile communication system.
Figure 2:
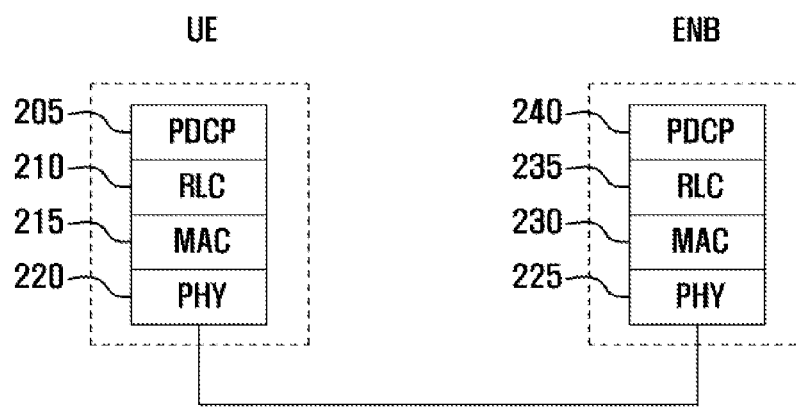
FIG. 2 is a diagram illustrating a user plane protocol stack architecture of an LTE mobile communication system.
Figure 3:
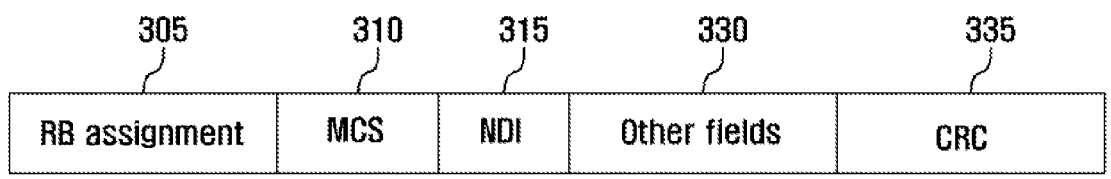
FIG. 3 is a diagram illustrating a message format of a resource assignment message.

The following description with reference to the accompanying drawings is provided to assist in a comprehensive understanding of exemplary embodiments of the present invention as defined by the claims and their equivalents. It includes various specific details to assist in that understanding but these are to be considered as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In an exemplary embodiment of the present invention, discrimination is made between the initial transmission and retransmission in a Hybrid Automatic Repeat reQuest (HARQ) process handling both the packets transmitted with the normal Cell-Radio Network Temporary Identifier (C-RNTI) and the packets transmitted the Semi-Persistent Scheduling (SPS) C-RNTI.

In an exemplary embodiment of the present invention, when a resource assignment message with the C-RNTI is received first after assignment of an SPS resource, the User Equipment (UE) considers the resource assignment message as a resource assignment message for a new initial transmission regardless of the value of the New Data Indicator (NDI).

In an exemplary embodiment of the present invention, the UE considers the resource assignment message with a C-RNTI received first in an HARQ process as a resource assignment message for a new initial transmission regardless of the NDI value.

In the downlink resource assignment message processing operation according to an exemplary embodiment of the present invention, when a resource assignment message with a Temporary C-RNTI (T C-RNTI) is received first, the UE determines whether the resource assignment message includes resource assignment information using the C-RNTI. If the resource assignment message identified the C-RNTI, the UE determines whether the resource configured after the most recent assignment with C-RNTI in the same HARQ process has been used and, if the configured resource has not been used, compares the current NDI value with the previous NDI value to determine whether the NDI is toggled.

In the uplink resource assignment message processing operation according an exemplary embodiment of the present invention, when the uplink resource assignment message is received, the UE determines whether resource assignment message is identified by the C-RNTI, determines, if the resource assignment information is identified by the C-RNTI, whether the resource configured after the receipt of the most recent resource assignment message identified by C-RNTI has been used in the same HARQ process, considers, if the resource configured after the receipt of the most recent resource assignment message identified by the C-RNTI has been used, that the NDI is toggled to indicate a new initial transmission, and otherwise, compares the current NDI value with the previous NDI value to determine whether the NDI is toggled.

In the downlink resource assignment message processing operation according to an exemplary embodiment of the present invention, when the downlink resource assignment message is received, the UE determines whether the downlink resource assignment message is the first one identified by a C-RNTI in the corresponding HARQ process. If the downlink resource assignment message is the first one identified by a C-RNTI in the corresponding HARQ process, the UE considers that the NDI is toggled and, otherwise, compares the current NDI value with the previous NDI value to determine whether the NDI is toggled.

In the uplink resource assignment message processing operation according to an exemplary embodiment of the present invention, when the uplink resource assignment message is received, the UE determines whether the uplink resources assignment message is the first one identified by a C-RNTI in the corresponding HARQ process. If the uplink resource assignment message is the first one identified by a C-RNTI in the corresponding HARQ process, the UE determines whether the NDI is toggled and, if the NDI is not toggled, requests the HARQ process for retransmission and, otherwise requests the HARQ process for new initial transmission.

The SPS resource is allocated for providing a service that generates small size packets repeatedly such as a Voice over Internet Protocol (VoIP) service. Whether to use the SPS resource is informed to the UE in the call establishment process along with the HARQ processes for the SPS.

In a normal VoIP traffic pattern, the VoIP packets are generated at an interval of 20 msec, and thus the SPS resource is set at the interval of 20 msec. Hereinafter, the time point at which the SPS resource starts is called "SPS occasion time". The base station allocates two HARQ processes for the SPS, and the two HARQ processes are activated alternately every 20 msec. Accordingly, the SPS occasion time of each HARQ process arrives every 40 msec, and the UE receives the VoIP packet on the SPS resource every 40 msec.

FIG. 4 is a diagram illustrating a principle of SPS resource assignment in a mobile communication system according to an exemplary embodiment of the present invention.

Referring to FIG. 4, it is assumed that HARQ process 1 and HARQ process 2 are configured for SPS, and the SPS resource is allocated every 20 msec. In this case, the HARQ process 1 receives the packets at the first SPS occasion 405 and the third SPS occasion 410, and the HARQ process 2 receives the packets at the second SPS occasion 415 and the fourth SPS occasion 420. When the two HARQ processes are configured for the SPS, each HARQ process receives the packets at an interval of 40 msec.

FIG. 5 is a diagram illustrating a principle of using both SPS resource assignment and dynamic resource assignment in a mobile communication system according to an exemplary embodiment of the present invention.

Referring to FIG. 5, when decoding of the packet received on the SPS resource fails, the packet is retransmitted in the HARQ process. The retransmission with the SPS resource is instructed by the SPS C-RNTI, and the NDI of the corresponding resource assignment message is set to 1 to indicate whether the resource assignment message is a new initial transmission or retransmission. If the HARQ retransmission of the packet on the SPS resource completes in 40 msec, the HARQ process can process the packet received on the dynamic resource before the next SPS occasion. For instance, if the HARQ operation on the packet completes (i.e., the UE decodes the packet successfully and transmits the HARQ Acknowledgement (ACK)) at a time as denoted by reference numeral 520 when the HARQ process 1 (PROC 1) processes the packet received on the SPS resource as denoted by reference numeral 510, the HARQ process 1 (PROC 1) can processes the packet received on the dynamic resource before the next SPS occasion of the HARQ process 1 (PROC 1) arrives as denoted by reference numeral 530. The base station transmits a resource assignment message with C-RNTI for the HARQ process 1 (PROC 1) as denoted by reference numeral 525, and the UE receives the packet transmitted on the dynamic resource by using the C-RNTI and makes a progress of the HARQ operation. At this time, in order to inform the UE that the packet received on the dynamic resource (i.e., the packet transmitted with the C-RNTI) is a new initial transmission, the NDI of the resource assignment message has to be set to an appropriate value.

As described with reference to FIG. 5, the C-RNTI-identified packet received first after the completion of the HARQ operation of the packet received on the SPS resource is always a new initial packet. Accordingly, the UE considers the corresponding packet as the initial transmission-indicative packet regardless of the value of NDI. Using this feature, it is possible to establish a rule that the first C-RNTI identified resource assignment message received after the configuration of the SPS resource assignment in an HARQ process is the resource assignment message indicative of an initial transmission.

Figure 6:
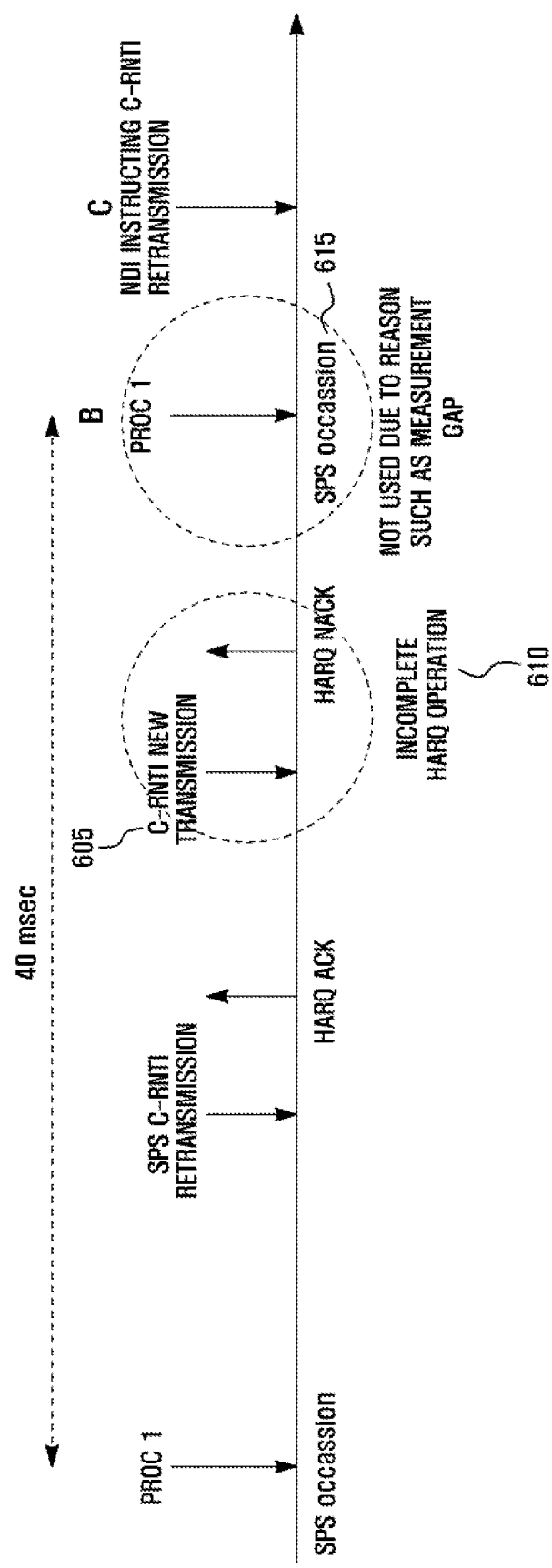
FIG. 6 is a diagram illustrating an operation of a resource assignment process in a mobile communication system according to an exemplary embodiment of the present invention.

FIG. 6 is a diagram illustrating an operation of a resource assignment process in a mobile communication system according to an exemplary embodiment of the present invention.

Referring to FIG. 6, the SPS resource assigned may not be used at any SPS occasion. For instance, when an SPS occasion is overlapped with a measurement gap configured for measuring another system or another frequency band, the SPS resource at the corresponding SPS occasion is not used. In this case, it is impossible for the base station to maintain the HARQ operation of the packet that is not processed completely in the corresponding HARQ process after the SPS occasion at which the SPS resource is not used, with the aforementioned NDI interpretation rule. For instance, the UE can receive the downlink resource assignment message identified with the C-RNTI after the completion of the HARQ process of the packet received on the SPS resource in the HARQ process 1. In which case, the UE considers the downlink resource assignment message as a resource assignment message indicative of a new initial transmission and receives and stores the downlink resource assignment message in the HARQ process 1.

If an SPS occasion 615 for the HARQ process 1 arrives in the state where the HARQ operation 610 of the packet is not completed, the UE discards the packet stored in the HARQ process 1 for processing the packet received on the SPS resource. In this case, the C-RNTI 605 identified resource assignment message received afterward in the HARQ process 1 is considered as the resource assignment message indicative of an initial transmission regardless of the NDI. If the SPS resource is not used at the SPS occasion because the SPS occasion is overlapped with the management gap, the packet stored in the HARQ process is discarded and thus the C-RNTI identified resource assignment message received afterward in the corresponding HARQ process can be considered as a resource assignment message indicative of an initial transmission. This causes inefficiency in that the chance to complete the HARQ operation that is not completed yet is ignored.

In an exemplary embodiment of the present invention, the UE flushes the HARQ buffer only when the SPS resource is actually used at the SPS occasion, and considers the C-RNTI identified resource assignment message received afterward as the resource assignment message indicative of an initial transmission. If the SPS resource is not used at the SPS occasion, the UE applies the aforementioned rule without flushing the corresponding HARQ buffer, thereby providing a chance to complete the incomplete HARQ operation. For instance, if a C-RNTI identified resource assignment message is received after an SPS occasion at which the SPS resource is not used, the UE discriminates between the initial transmission and retransmission by comparing the NDI of the resource assignment message with the NDI of the packet of which HARQ operation is not completed. If the NDIs of the resource assignment message and the HARQ operation-incomplete packet are identical with each other, the UE performs soft combining of the currently received packet and the previously received packet to continue HARQ operation.

First Exemplary Embodiment

Figure 7:
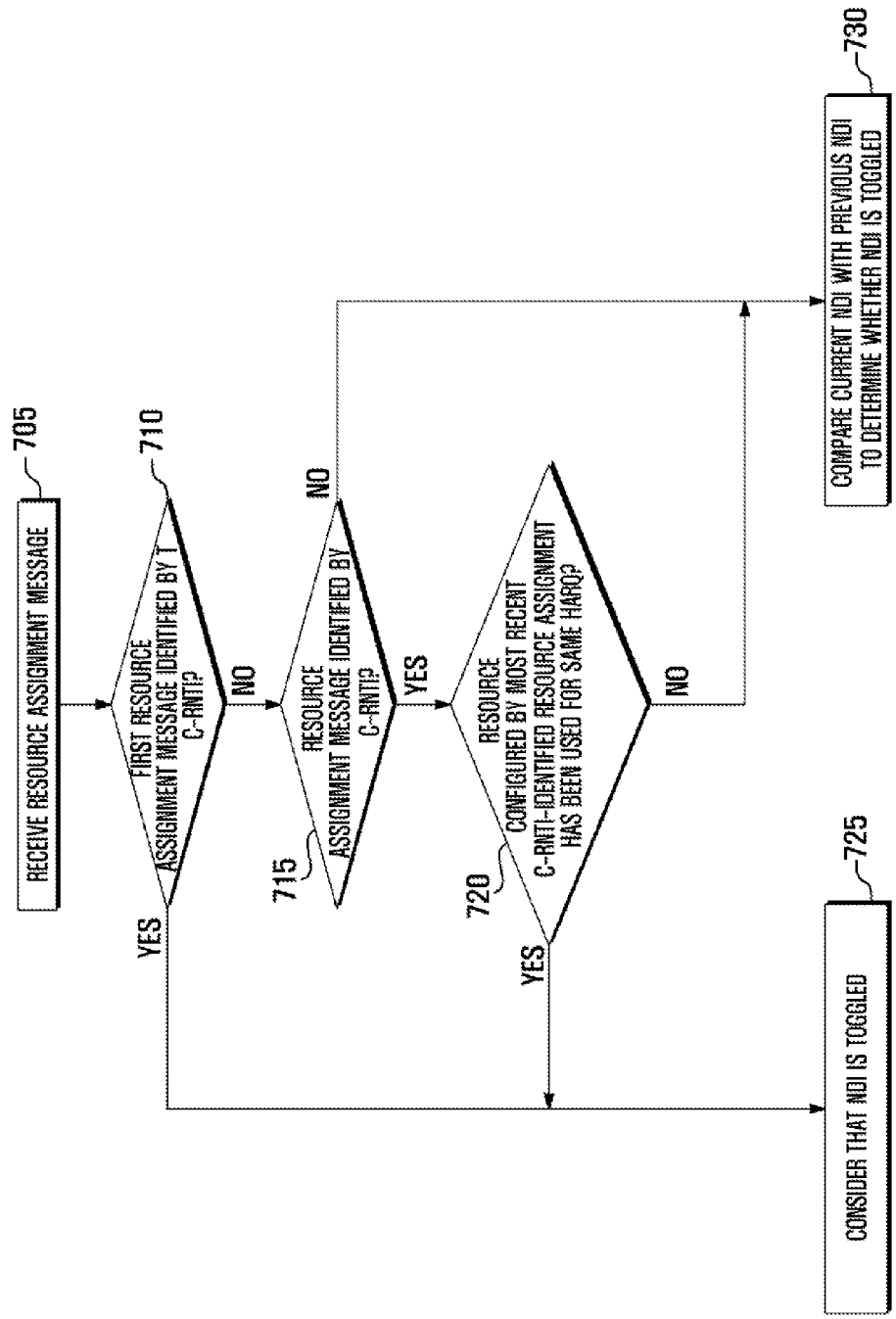
FIG. 7 is a flowchart illustrating a procedure for processing a downlink resource assignment message in a User Equipment (UE) according to an exemplary embodiment of the present invention.

FIG. 7 is a flowchart illustrating a procedure for processing a downlink resource assignment message in a UE according to an exemplary embodiment of the present invention.

Referring to FIG. 7, the UE receives a resource assignment message transmitted on a downlink control channel by a base station at step 705. If the resource assignment message is received, the UE determines whether the resource assignment message is a first resource assignment message identified by a T C-RNTI at step 710. The T C-RNTI is a UE identifier for use in the random access procedure. Since the NDI value of the received first resource assignment message for the T C-RNTI has no previous NDI value to compare, the received first resource assignment message identified by the T C-RNTI is considered as the resource assignment message indicative of an initial transmission. Accordingly, if it is determined at step 710 that the resource assignment message is the first downlink assignment message by the T C-RNTI, the UE considers that the NDI is toggled at step 725 as the downlink resource assignment message is indicative of an initial transmission.

In contrast, if it is determined at step 710 that the downlink resource assignment is not the first downlink assignment message identified by the T C-RNTI, the UE determines whether the resource assignment message is identified by a C-RNTI at step 715.

If it is determined at step 715 that the resource assignment message is identified by the C-RNTI, the UE determines at step 720 whether configured resource assignment prior to the most recent C-RNTI identified resource assignment has been used in the HARQ process. UE considers the NDI to have been toggled regardless of the value of the NDI because the C-RNTI identified resource assignment message is the first resource assignment message since SPS resource has been used. Here, the fact that the SPS resource is used means that the configured SPS resource assignment information is processed. In an exemplary implementation, this is to inspect whether the configured downlink resource assignment has been processed in the corresponding HARQ process after the most recent C-RNTI identified resource assignment.

If it is determined at step 720 that the SPS resource configured prior to the resource assignment by the most recent C-RNTI-identified resource assignment message has been used in the HARQ process indicated by the current C-RNTI identified resource assignment message, this indicates that the C-RNTI identified resource assignment message is the first C-RNTI identified message received since the configured SPS resource has been used. In this case, the UE considers that the NDI is toggled regardless of the value of the NDI at step 725. In contrast, if it is determined at step 720 that the SPS resource assignment configured prior to the resource assignment by the most recent C-RNTI identified resource assignment message has not been used in the HARQ process indicated by the current C-RNTI identified resource assignment message, the UE determines whether the NDI is toggled by comparing the current NDI value with the previously received NDI value at step 730. In another exemplary implementation, when Multi Input Multi Output (MIMO) is used, a single HARQ process can process two Transport Blocks (TBs). In this case, the NDI is defined per TB. Accordingly, the HARQ process can be substituted by Transport Block (TB) at step 720. For instance, the UE can be configured to determine whether the SPS resource has been used in the TB indicated by the currently received resource assignment message since the most recent resource assignment by the C-RNTI identified resource assignment message.

In contrast, if it is determined at step 715 that the resource assignment message is not identified by the C-RNTI, the UE determines whether the NDI is toggled by comparing the current NDI value with the previously received NDI value at step 730. That is, the rule at step 720 is applied only when the C-RNTI identifies the resource assignment message. This is because the application of the rule at step 720 to the T C-RNTI identified resource assignment message causes a problem in the random access process. In more detail, the T C-RNTI is used for downlink transmission of the last message in a random access process. At this time, the retransmission can be performed with the T C-RNTI. In this case, the NDI is set to the same value as the previous value to inform that the downlink resource assignment message is indicative of the retransmission. If the rule at step 720 is applied, the UE, which has configured the SPS resource, can misinterpret the resource assignment message identified by the T C-RNTI for retransmission as the resource assignment message for initial transmission in the random access procedure, resulting in failure of HARQ retransmission. Accordingly, it is preferred to apply the determination rule at step 720 to the C-RNTI identified resource assignment message.

Figure 8:
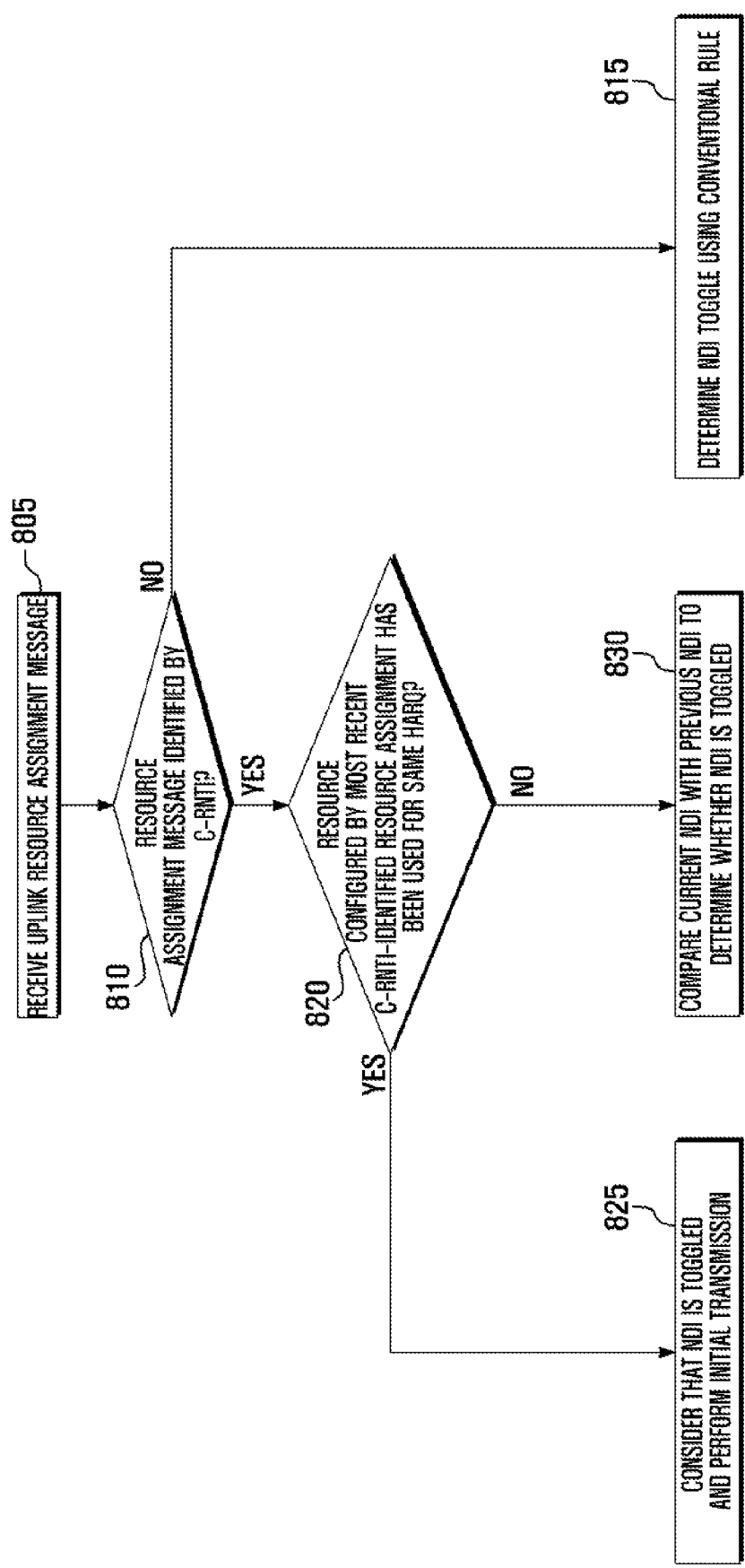
FIG. 8 is a flowchart illustrating a procedure for processing an uplink resource assignment message (uplink grant) in a UE according to an exemplary embodiment of the present invention.

FIG. 8 is a flowchart illustrating a procedure for processing an uplink resource assignment message (uplink grant) in a UE according to an exemplary embodiment of the present invention.

Referring to FIG. 8, the UE receives an uplink resource assignment message transmitted by a base station at step 805. If the uplink resource assignment message is received, the UE determines whether the uplink resource assignment message has been received for the UE's C-RNTI at step 810. If it is determined at step 810 that the uplink resource assignment message has not been received for the UE's C-RNTI, the UE determines whether the NDI is toggled according to a conventional determination rule at step 815. This is because the newly introduced NDI toggle determination step 802 may cause malfunction in the random access process when the uplink resource assignment message is not for the UE's C-RNTI.

In contrast, if it is determined at step 810 that the uplink resource assignment message has been received for the UE's C-RNTI, the UE determines whether the SPS resource configured by the most recent C-RNTI identified uplink resource assignment message has been used in the HARQ process indicated by the current uplink resource assignment message at step 820. If it is determined at step 820 that the SPS resource configured by the most recent C-RNTI identified uplink resource assignment message has been used in the HARQ process indicated by the current uplink resource assignment message, the UE considers that the NDI is toggled and thus the HARQ process performs a new initial transmission at step 825. Otherwise, if it is determined at step 820 that the SPS resource configured by the most recent C-RNTI identified uplink resource assignment message has not been used in the HARQ process indicated by the current uplink resource assignment message, the UE compares the current NDI value with the previous NDI value (e.g., most recently stored NDI) to determine whether the NDI is toggled at step 830.

Second Exemplary Embodiment

As aforementioned, since the NDI value of the resource assignment message received first in an HARQ process has no comparison target, the first resource assignment message is considered as the resource assignment message indicative of an initial transmission regardless of the NDI value. This rule may cause a problem in a random access process.

Figure 9:
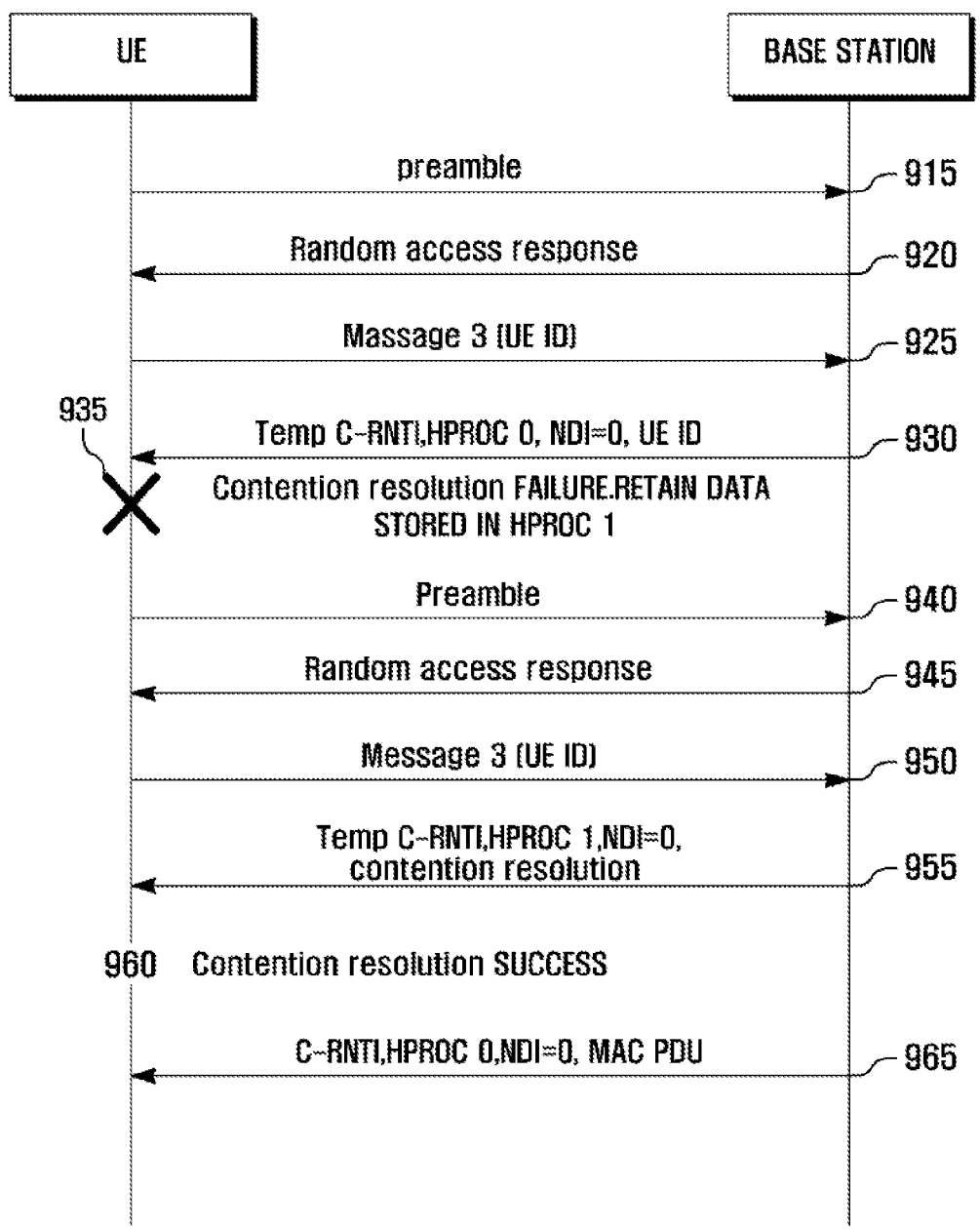
FIG. 9 is a sequence diagram illustrating a problematic situation caused by misinterpretation of the New Data Indicator (NDI) in random access process and to be solved by a transmission control method according to an exemplary embodiment of the present invention.

FIG. 9 is a sequence diagram illustrating a problematic situation caused by misinterpretation of the NDI in a random access process and to be addressed by a transmission control method according to an exemplary embodiment of the present invention. The problematic situation is described using an exemplary case where a UE performs a random access to a base station.

Referring to FIG. 9, the UE selects a random access preamble from a preamble set and transmits the selected preamble to the base station at a predetermined time point at step 915. Upon receipt of the preamble, the base station generates a random access response message and transmits the random access response message to the UE in response to the preamble at step 920. The random access response message includes an uplink resource assignment message and a T C-RNTI for the UE to transmit a 'message containing UE's identifier'. Upon receipt of the random access response message, the UE transmits an uplink message (message 3) using the T C-RNTI and the uplink resource at step 925. The uplink message contains an identifier of the UE.

If the uplink message is received, the base station generates a downlink message containing the identifier of the UE and transmits the downlink message to the UE in a normal HARQ process at step 930. This downlink message is called a Contention Resolution message. If the Contention Resolution message is received, the UE checks the UE identifier contained in the Contention Resolution message and completes the random access process.

When multiple UEs have transmitted the same preambles simultaneously, the Contention Resolution message may contain an identifier of a different UE rather than the UE performing the random access process (hereinafter called "access UE"). In this case, the access UE considers this as a contention resolution failure 935. The access UE again selects a preamble for transmission to the base station at step 940, and receives the random access response message transmitted by the base station at step 945. Upon receipt of the random access response message, the UE again transmits an uplink message (message 3) using the T C-RNTI and the uplink resource at step 950. If the uplink message is received, the base station generates a downlink message containing the identifier of the UE and transmits the downlink message to the UE in a normal HARQ process at step 955. If the second random access process has completed successfully at step 960, the UE and base station can progress using the normal transmission process at step 965. At this time, since the HARQ process in which the Contention Resolution message has been processed with the failed first random access attempt (e.g., HARQ process 0) has operated with the T C-RNTI already, if a downlink resource assignment message is received afterward in the HARQ process 0, the UE determines, based on the used NDI, whether the downlink resource assignment message is indicative of an initial transmission or retransmission.

The base station does not identify the access UE yet and the Contention Resolution fails at step 930 where the base station transmits the Contention Resolution message to the access UE, it cannot register which NDI is used in the HARQ process 0. Accordingly, the base station cannot set the NDI of the uplink resource assignment message transmitted for the HARQ process 0 after the success of random access afterword in consideration of the previous random access failure.

In order to address this problem, when the resource assignment message identified by the C-RNTI is received first in an HARQ process, the UE according to an exemplary embodiment of the present invention is configured to consider the resource assignment message as indicative of the initial transmission regardless of the NDI value.

Figure 10:
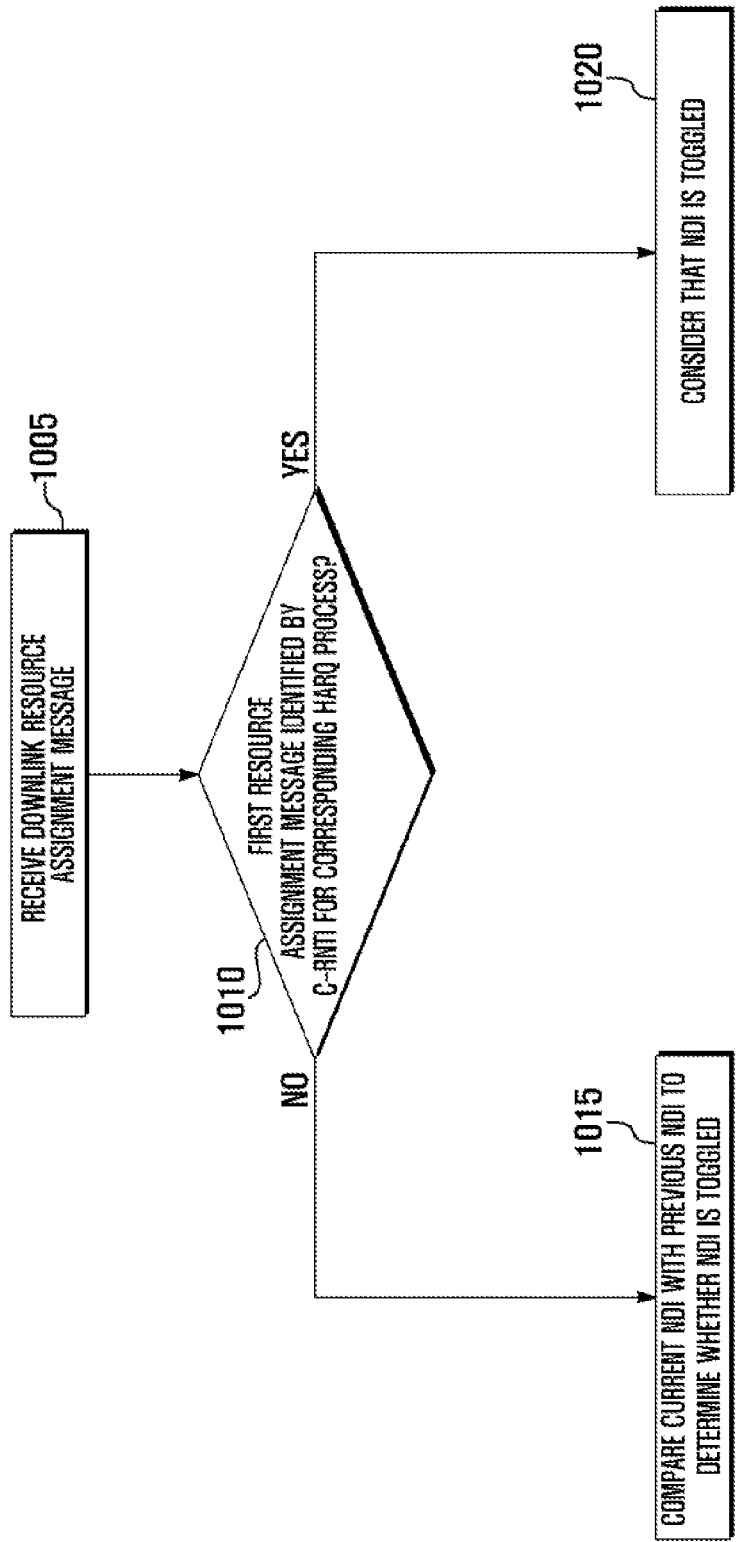
FIG. 10 is a flowchart illustrating a procedure for processing a downlink resource assignment message in a UE according to an exemplary embodiment of the present invention.

FIG. 10 is a flowchart illustrating a procedure for processing a downlink resource assignment message in a UE according to an exemplary embodiment of the present invention.

Referring to FIG. 10, the UE receives a downlink resource assignment message at step 1005. When the downlink resource assignment message is received, the UE determines whether the downlink resource assignment message is a C-RNTI identified downlink resource assignment message received first for the corresponding HARQ process at step 1010. That is, the UE determines if the downlink resource assignment message is identified by the C-RNTI and if the downlink resource assignment message identified by the C-RNTI has been received since the MAC has been set or reset for the HARQ process indicated by the current downlink resource assignment message. If it is determined at step 1010 that the downlink resource assignment message is a C-RNTI identified downlink resource assignment message received first for the corresponding HARQ process, the UE considers that the NDI value is toggled at step 1020 (i.e., the downlink resource assignment message is indicative of initial transmission). In contrast, if it is determined at step 1010 that the downlink resource assignment message is not a C-RNTI identified downlink resource assignment message received first for the corresponding HARQ process, the UE compares the current NDI with the previous NDI to determine whether the NDI is toggled at step 1015 (i.e., whether the downlink resource assignment is indicative of initial transmission or retransmission).

Figure 11:
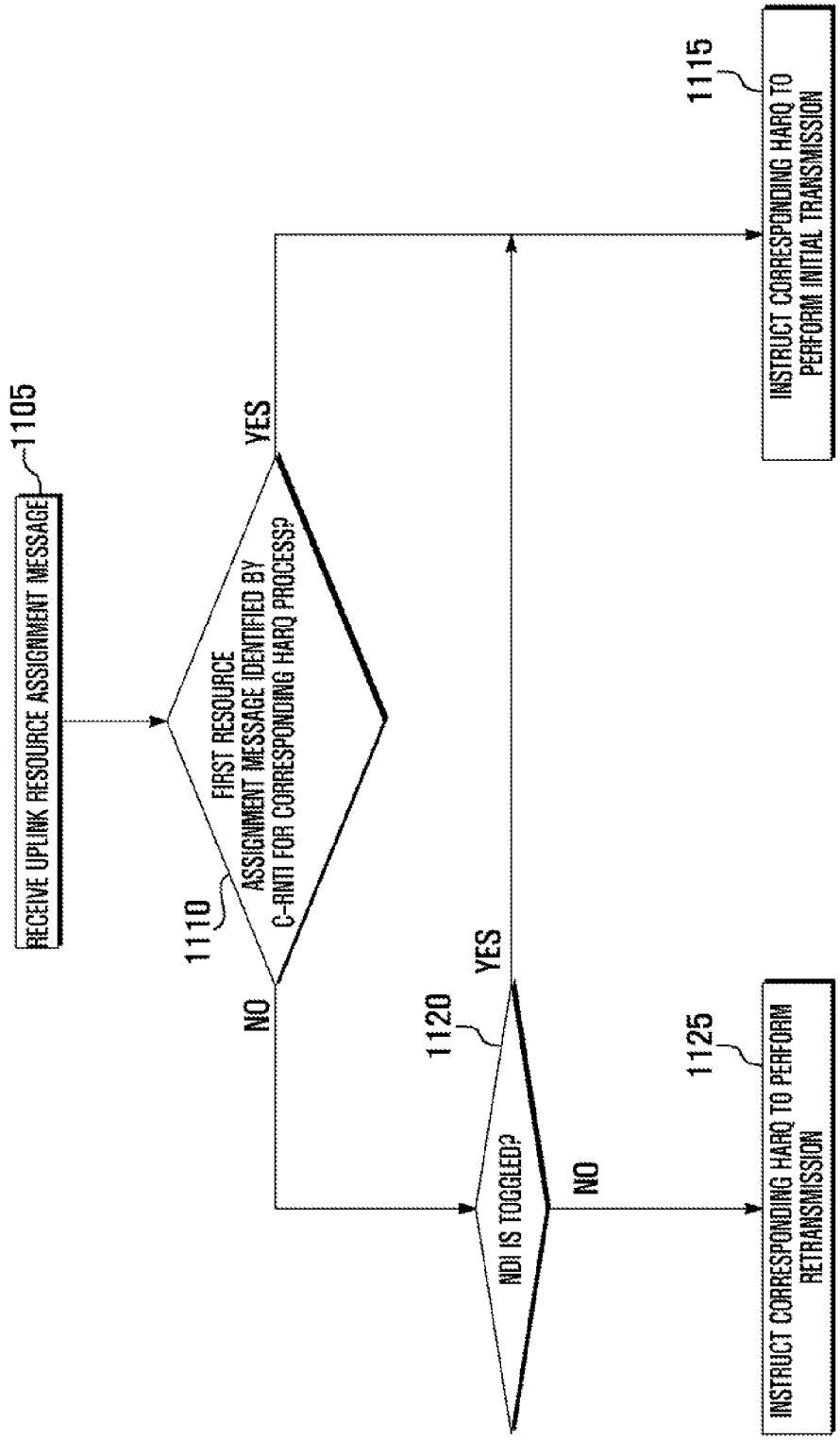
FIG. 11 is a flowchart illustrating a procedure for processing an uplink resource assignment message in a UE according to an exemplary embodiment of the present invention.

FIG. 11 is a flowchart illustrating a procedure for processing an uplink resource assignment message in a UE according to an exemplary embodiment of the present invention.

Referring to FIG. 11, the UE receives an uplink resource assignment message at step 1105. When the uplink resource assignment message is received, the UE determines whether the uplink resource assignment message is a C-RNTI identified uplink resource assignment message received first for the corresponding HARQ process at step 1110. That is, the UE determines if the uplink resource assignment message is identified by the C-RNTI and if an uplink resource assignment message identified by the C-RNTI has been received since the MAC has been set or reset for the HARQ process indicated by the current uplink resource assignment message. If it is determined at step 1110 that the uplink resource assignment message is a C-RNTI identified uplink resource assignment message received first for the corresponding HARQ process, the UE instructs the corresponding HARQ process to perform a new initial transmission on the resource indicated by the uplink resource assignment message at step 1115. In contrast, if it is determined at step 1110 that the uplink resource assignment message is not a C-RNTI identified uplink resource assignment message received first for the corresponding HARQ process, the UE compares the current NDI value with the previous NDI value to determine whether the NDI is toggled at step 1120. If the NDIs are different from each other (i.e., if the NDI is toggled), this means that the C-RNTI identified uplink resource assignment message is indicative of a new initial transmission, and thus the UE instructs the corresponding HARQ process to perform a new initial transmission on the resource indicated by the uplink resource assignment message at step 1115. In contrast, if it is determined that the NDIs are not identical with each other (i.e., if the NDI is not toggled), this means that the C-RNTI identified uplink resource assignment message is indicative of the retransmission, and thus the UE instructs the corresponding HARQ process to perform the retransmission at step 1125.

Third Exemplary Embodiment

In another exemplary embodiment of the present invention, if an uplink resource assignment message (or uplink grant) identified by a T C-RNTI is received and the uplink resource assignment message is the first uplink resource assignment message for an HARQ process, the uplink resource assignment message is ignored. According to the current standard specification, the UE must perform the retransmission. However, since this situation occurs due to the misinterpretation of the uplink resource assignment message destined to another UE, the uplink transmission based on the misinterpreted uplink resource assignment message causes unnecessary uplink interference.

For instance, if two different UEs transmit the same preamble and one of the UEs has success with the random access process and the other fails the contention, the contention-failed UE does not know of the contention failure so as to monitor the T C-RNTI. Meanwhile, since the successful UE has configured the T C-RNTI as its C-RNTI in the random access process, when the uplink resource assignment message is transmitted to the contention-successful UE, the contention-failed UE misinterprets the uplink resource assignment message as the uplink assignment message destined for itself.

FIG. 12 is a sequence diagram illustrating a procedure for processing an uplink resource assignment message in a UE according to an exemplary embodiment of the present invention.

Referring to FIG. 12, the UE receives an uplink resource assignment message (or uplink grant) at step 1205. If the uplink resource assignment message is received, the UE determines whether the uplink resource assignment message identified by the T C-RNTI is received on the Physical Downlink Control Channel (PDCCH) and is the very first uplink resource assignment message for the corresponding HARQ process at step 1210. The PDCCH is a downlink control channel for transmitting the uplink resource assignment message. The uplink resource assignment messages are transmitted on the PDCCH in general and can be received by a random access response message with the T C-RNTI. The uplink resource assignment message carried by the random access response message is always indicative of the initial transmission. In case that the uplink resource assignment message is received through the random access response message, the UE must not ignore the uplink resource assignment message. As aforementioned, if the uplink resource assignment message is the very first uplink resource assignment message for an HARQ process but identified by the T C-RNTI, this indicates that the uplink resource assignment message is the uplink resource assignment message destined to other UE. Accordingly, if it is determined at step 1210 that the uplink resource assignment message identified by the T C-RNTI is received on the PDCCH and is the very first uplink resource assignment message, the UE ignores the uplink resource assignment message at step 1220, and determines that the random access process has failed and performs an appropriate operation at step 1225. For instance, the UE can repeat the random access process by transmitting the preamble. Otherwise, if it is determined at step 1210 that neither the uplink resource assignment message identified by the T C-RNTI is received on the PDCCH nor the uplink resource assignment message is the very first uplink resource assignment message for a HARQ process, the UE operates according to the conventional procedure at step 1215. For instance, the UE determines whether the NDI is toggled and performs the initial transmission and retransmission using the assignment resource based on the determination result.

FIG. 13 is a block diagram illustrating a configuration of a UE according to an exemplary embodiment of the present invention.

As shown in FIG. 13, the UE includes an upper layer entity 1305, a reception HARQ processor 1310, a transceiver 1315, a PDCCH processor 1320, an HARQ controller 1325, and a transmission HARQ processor 1330.

The transceiver 1315 is responsible for transmitting and receiving signals carrying the PDCCH and other traffic. The transceiver 1315 decodes the signal received on the PDCCH and outputs the decoded signal to the PDCCH processor 1320. The PDCCH processor 1320 performs CRC testing on the signal decoded by the transceiver 1315 to detect an error and outputs the signal that passed the CRC test to the HARQ controller 1325 in the form of a resource assignment message. The HARQ controller 1325 interprets the resource assignment message and controls the reception HARQ processor 1310 or the transmission HARQ processor 1330 to perform initial transmission or retransmission. The upper layer entity 1305 can be a Radio Link Control (RLC) layer entity, a Packet Data Convergence Protocol (PDCP) layer entity, or a multiplexer of a MAC layer. The reception HARQ processor 1310 includes a plurality of reception HARQ processes that are responsible for the respective HARQ reception operations. The transmission HARQ processor 1330 includes a plurality of transmission HARQ processes that are responsible for the respective HARQ transmission operations.

An exemplary resource assignment message processing operation of the above structured UE is described hereinafter.

In an exemplary embodiment of the present invention, the UE processes a downlink resource assignment message as follows. The transceiver 1315 decodes the received signal and outputs the decoded signal to the PDCCH processor 1320. The PDCCH processor 1320 performs a CRC test on the signal decoded by the transceiver 1315 and outputs the signal that passes the CRC test to the HARQ controller 1325 in the form of a resource assignment message. The HARQ controller 1325 determines whether the resource assignment message is a resource assignment message identified by a T C-RNTI. If the resource assignment message is a resource assignment message identified by a T C-RNTI, the HARQ controller 1325 considers that the NDI is toggled. Otherwise, if the resource assignment message is not a resource assignment message identified by a T C-RNTI, the HARQ controller 1325 determines whether the resource assignment message is a resource assignment message identified by a C-RNTI. If the resource assignment message is not a resource assignment message identified by a C-RNTI, the HARQ controller 1325 compares the current NDI value and the previous NDI value to determine whether the NDI is toggled.

In contrast, if the resource assignment message is a resource assignment message identified by a C-RNTI, the HARQ controller 1325 determines whether the resource configured by the most recent C-RNTI identified resource assignment message has been used in the HARQ process indicated by the current C-RNTI identified resource assignment message. If the resource configured by the most recent C-RNTI identified resource assignment message has been used in the HARQ process indicated by the current C-RNTI identified resource assignment message, the HARQ controller 1325 determines that the NDI is toggled and, otherwise, the HARQ controller 1325 compares the current NDI value with the previous NDI value to determine whether the NDI is toggled.

Next, the HARQ controller 1325 controls the reception HARQ processor 1310 to perform the HARQ reception process depending on the determination result on whether the NDI is toggled. The reception HARQ processor 1310 delivers the HARQ process result to the upper layer entity 1305.

In an exemplary embodiment of the present invention, the UE processes an uplink resource assignment message as follows. The transceiver 1315 decodes the received signal and outputs the decoded signal to the PDCCH processor 1320. The PDCCH processor 1320 performs a CRC test on the signal decoded by the transceiver 1315 and outputs the signal that passes the CRC test to the HARQ controller 1325 in the form of a resource assignment message. The HARQ controller 1325 determines whether the resource assignment message is a resource assignment message identified by a C-RNTI. If the resource assignment message is not a resource assignment message identified by a C-RNTI, the HARQ controller 1325 determines whether the NDI is toggled according to a conventional rule. Otherwise, if the resource assignment message is a resource assignment message identified by a C-RNTI, the HARQ controller 1325 determines whether the resource configured by the most recent C-RNTI identified resource assignment message has been used in the HARQ process indicated by the current C-RNTI identified resource assignment message. If the resource configured by the most recent C-RNTI identified resource assignment message has been used in the HARQ process indicated by the current C-RNTI identified resource assignment message, the HARQ controller 1325 determines that the NDI is toggled and instructs the transmission HARQ processor 1330 to perform a new initial transmission. Otherwise, the HARQ controller 1325 compares the current NDI value and the previous NDI value to determine whether the NDI is toggled.

Next, the HARQ controller 1325 controls the transmission HARQ processor 1330 to perform an initial transmission or retransmission depending on whether the NDI is toggled or not.

In an exemplary embodiment of the present invention, the UE processes a downlink resource assignment message as follows. If a downlink resource assignment message is received, the HARQ controller 1325 determines whether the downlink resource assignment message is a first C-RNTI identified resource assignment message for the corresponding HARQ process. If the downlink resource assignment message is the first C-RNTI identified resource assignment message for the corresponding HARQ process, the HARQ controller 1325 determines that the NDI is toggled. Otherwise, the HARQ controller 1325 compares the current NDI value with the previous NDI value to determine whether the NDI is toggled.

In an exemplary embodiment of the present invention, the UE processes an uplink resource assignment message as follows. If an uplink resource assignment message is received, the HARQ controller 1325 determines whether the uplink resource assignment message is a first C-RNTI identified resource assignment message for the corresponding HARQ process. If the uplink resource assignment message is not the first C-RNTI identified resource assignment message for the corresponding HARQ process, the HARQ controller 1325 instructs the transmission HARQ processor 1330 to perform a new initial transmission. Otherwise, if the uplink resource assignment message is the first C-RNTI identified resource assignment message, the HARQ controller 1325 determines whether the NDI is toggled and instructs the transmission HARQ processor 1330 to perform an initial transmission or retransmission depending on whether the NDI is toggled or not. That is, if it is determined that the NDI is toggled, the HARQ controller 1325 instructs the transmission HARQ processor 1330 to perform a new initial transmission. Otherwise, the HARQ controller 1325 instructs the transmission HARQ processor 1330 to perform retransmission.

The transmission HARQ processor performs the initial transmission or the retransmission by means of the transceiver 1315 under the control of the HARQ controller 1325.

In another exemplary embodiment of the present invention, the UE processes an uplink resource assignment message as follows. If an uplink resource assignment message is received, the HARQ controller 1325 determines whether the uplink resource assignment message is identified by the T C-RNTI and received on the PDCCH and whether the uplink resource assignment is the very first resource assignment message for a HARQ process. If all these conditions are satisfied, this means that the uplink resource assignment message is destined to another UE and thus the HARQ controller 1325 ignores the uplink resource assignment message and determines that the random access process fails to perform an appropriate operation.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains As described above, the transmission control method for HARQ in a mobile communication system according to an exemplary embodiment of the present invention is capable of discriminating between initial transmission or retransmission of a packet in the HARQ process handling the packets transmitted on the SPS resource and the dynamic scheduling resource.

As described above, the signal transmission method and apparatus for a mobile communication system according to exemplary embodiments of the present invention enable a UE to discriminate the uplink transmission resource assignment messages indicative of initial transmission and retransmission of data accurately, thereby reducing waste of resources caused by misidentification of the uplink transmission resource assignment message.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A transmission control method for hybrid automatic repeat request (HARQ) in a mobile communication system, the method comprising:
   receiving a downlink resource assignment on a downlink control channel;
   determining whether the received downlink resource assignment is for a user equipment's (UE's) cell-radio network temporary identifier (C-RNTI) and determining whether a previous downlink resource assignment was a downlink assignment configured for a semi-persistence scheduling (SPS);
   determining, when the previous downlink resource assignment occurred, a HARQ entity of a HARQ process was indicated to receive data based on resources allocated according to the previous downlink resource assignment; and
   considering, if it is determined that the received downlink resource assignment is for the UE's C-RNTI and the previous downlink resource assignment was the downlink resource assignment configured for the SPS and the HARQ entity of the HARQ process was indicated to receive data based on resources allocated according to the previous downlink resource assignment, when the previous downlink resource assignment was received, a new data indicator (NDI) of the downlink resource assignment to have been toggled regardless of a value of the NDI,
   wherein, if one or more transport blocks (TBs) are associated with the HARQ process, the NDI is defined for each TB.

2. The method of claim 1, further comprising:
   maintaining, if it is determined that at least one of the received downlink resource assignment is not for the UE's C-RNTI and/or the previous downlink resource assignment indicated to the HARQ entity of the HARQ process was not the downlink resource assignment configured for the SPS, the HARQ process according to whether the value of the current NDI has been toggled.

3. The method of claim 2, wherein the maintaining of the HARQ process comprises:
   comparing a current NDI of the downlink resource assignment message with a previous NDI;
   maintaining, if the current NDI and the previous NDI are identical with each other, the HARQ process; and
   processing, if the current NDI and the previous NDI are different from each other, the downlink resource assignment message as the resource assignment message for initial transmission.

4. The method of claim 1, wherein the C-RNTI comprises a temporary cell-radio network temporary identifier (TC-RNTI).

5. A transmission control apparatus for hybrid automatic repeat request (HARQ) in a mobile communication system, the apparatus comprising:
   a processor; and
   a memory storing one or more computer programs configured to be executed by the processor, the one or more computer programs including instructions to:
      receive a downlink resource assignment on a downlink control channel,
      determine whether the received downlink resource assignment is for a user equipment's (UE's) cell-radio network temporary identifier (C-RNTI),
      determine whether a previous downlink resource assignment was a downlink assignment configured for a semi-persistence scheduling (SPS),
      determine, when the previous downlink resource assignment occurred, a HARQ entity of a HARQ process was indicated to receive data based on resources allocated according to the previous downlink resource assignment, and
      consider, if it is determined that the received downlink resource assignment is for the UE's C-RNTI and the previous downlink resource assignment was the downlink resource assignment configured for the SPS, and the HARQ entity of the HARQ process was indicated to receive data based on resources allocated according to the previous downlink resource assignment, when the previous downlink resource assignment was received, a new data indicator (NDI) of the downlink resource assignment to have been toggled regardless of a value of the NDI,
   wherein, if one or more transport blocks (TBs) are associated with the HARQ process, the NDI is defined for each TB.

6. The apparatus of claim 5, wherein the processor is further configured to:
   maintain, if it is determined that at least one of the received downlink resource assignment is not for the UE's C-RNTI and/or the previous downlink resource assignment indicated to the HARQ entity of the HARQ process was not the downlink resource assignment configured for the SPS, the HARQ process according to whether the value of the current NDI has been toggled.

7. The apparatus of claim 6, wherein the processor is further configured to:
   compare a current NDI of the downlink resource assignment message with a previous NDI,
   maintain, if the current NDI and the previous NDI are identical with each other, the HARQ process, and
   process, if the current NDI and the previous NDI are different from each other, the downlink resource assignment message as the resource assignment message for initial transmission when the maintaining the HARQ process.

8. The apparatus of claim 5, wherein the C-RNTI comprises a temporary cell-radio network temporary identifier (TC-RNTI).

* * * * *